United States Patent Office 2,899,403
Patented Aug. 11, 1959

2,899,403

LOW VISCOSITY POLYSILOXANES AND COMPOSITIONS PREPARED THEREWITH

Daniel W. Lewis, Pittsburgh, Pa., assignor to Westinghouse Electric Corporation, East Pittsburgh, Pa., a corporation of Pennsylvania No Drawing. Application June 13, 1955
Serial No. 515,259

6 Claims. (Cl. 260—42)

This invention relates to liquid polysiloxanes of low viscosity and siloxane compositions prepared therewith.

While a number of liquid polysiloxanes have been prepared heretofore, in many cases liquid polysiloxanes that possess reasonable stability and low vapor pressure are characterized by substantial viscosity of the order of 10 poises and higher at 25° C. Thus methyl silicone fluids which have been considered to have the lowest viscosities of any liquid silicone are quite volatile liquids which boil at moderate temperatures if their viscositiy is below 50 centipoises. Since the composition often must be applied to members while at temperatures of from 50° C. to 100° C., and the compositions are heated even higher to cure them, the vapor pressures at these temperatures should be low to prevent undue losses. The substitution of phenyl and other heavier organic groups for the methyl groups in the dimethyl silicones results in a marked increase in viscosity of the resulting fluids even for low molecular weight polymers.

It has long been desirable to have available a reactive polysiloxane of low viscosity in which there are attached to the silicon atoms both phenyl groups and reactive olefinic groups such as vinyl radicals. However, up to the present time such latter compounds were available only as thick liquids of viscosities of not below 10 poises and usually much higher. For many applications particularly in the electrical industry compositions of such high viscosity have been difficult to handle and to apply to members to insure rapid and thorough impregnation in potting, encapsulating, and other applications. Furthermore, it has long been desirable to have available a polysiloxane compound which will react completely and cure into a solid in a reasonable period of time of the order of several hours at a temperature of the order of 100° C. to 200° C. and preferably below 160° C. Such compositions should be completely reactive to produce a thermoset resin without evolving any water or other volatile products, or evaporating while being handled and cured. The solid thermoset resinous siloxane products produced by curing should have no voids or cracks and consequently should polymerize with a low percentage of shrinkage as compared to the volume occupied by the liquid previous to thermosetting.

The object of the present invention is to produce end-blocked linear polysiloxanes having methyl, vinyl and phenyl radicals directly attached to silicon, some polysiloxanes being liquids of an extremely low viscosity of less than one poise at 25° C. and with low vapor pressure at temperatures of up to 100° C. and higher, and readily completely reactive to form void-free resinous homopolymer and copolymer solids.

Another object of the invention is to prepare a polysiloxane composition comprising a mixture of a low viscosity polymerizable end-blocked linear polysiloxane having phenyl, vinyl and methyl radicals attached to silicon and a high viscosity fluid siloxane having a substantial number of phenyl or methyl radicals or both attached to silicon and having at least one vinyl group per molecule.

Other objects of the invention will in part be obvious and will in part appear hereinafter.

For a better understanding of the nature and objects of the invention reference should be made to the following description.

I have discovered linear end-blocked readily reactive fluid polysiloxanes of a low viscosity of below about 1 poise at 25° C. and of low vapor pressure at temperatures of up to 100° C., and higher, and having the following structural formulation:

(1)

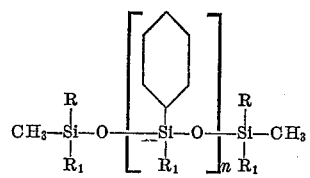

wherein R represents a monovalent radical selected from the group consisting of alkyl radicals having not exceeding four carbon atoms and aryl radicals comprising a benzene ring with not more than two methyl groups substituted for hydrogen, wherein $R_1$ represents a monovalent radical selected from the group consisting of vinyl and methyl radicals, there being at least two vinyl radicals per molecule, and $n$ is at least two, and has an average value of from 2 to 10. For some applications the polysiloxanes of a viscosity of above one poise are quite useful and consequently $n$ can exceed 10 in Formulation 1.

The polysiloxane compounds wherein $n$ is 1 in the above Formulation 1 are quite volatile. On heating to 100° C. to 140° C. coils impregnated with polysiloxanes wherein a substantial portion comprises compounds wherein $n$ is 1, copious fumes and vapors of the latter compounds are observed. Compounds wherein $n$ is 2 exhibit a marked decrease in vapor pressure as compared to the compounds wherein $n$ is 1, for instance, they will not boil at 85° C. to 100° C. even at pressures of 0.1 mm. Hg. The differences in viscosity of the polysiloxane compounds is quite small for values of $n$ of from 2 to 10. Consequently, it is preferred to carry out the reactions to produce the minimum of polysiloxane with $n=1$. If there is present more than a few percent by weight of the polysiloxane with $n=1$, it can be and should be readily separated by fractional distillation. Small quantities of this particular compound, of course, can be present for some uses without trouble being encountered, particularly if containing two vinyl groups.

Particularly good polysiloxanes are those having the following formulation:

(2)

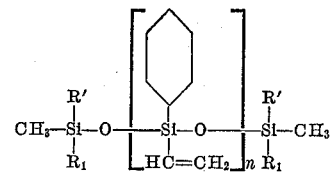

where R' represents a monovalent radical selected from the group consisting of methyl and phenyl radicals and $R_1$ represents a monovalent radical selected from the group consisting of methyl and vinyl radicals, there being an average of at least two vinyl radicals per molecule, and $n$ is at least two and has an average value of from 2 to 10, and higher.

Especially low viscosity fluids comprise the following formulation:

(3)

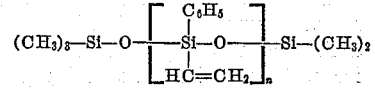

where $n$ is at least two and has an average value of from 2 to 10.

Fluids corresponding to Formula 2 having a viscosity of from approximately 10 to 40 centipoises at 25° C. are obtained when $n$ in the formula has an average value of from 2.0 to 3.5. In (3), when $n$ has an average value of 2.5, the viscosity of the fluid is approximately 15 centistokes at 25° C., and when $n$ has an average of 3, the viscosity is approximately 20 centistokes at 25° C.

The low-viscosity fluid polysiloxanes of this invention may be prepared by admixing ($a$) two mols of a silane having the formula

where R represents a monovalent radical selected from the group consisting of alkyl radicals having not more than four carbon atoms, namely, methyl, ethyl, n-butyl, isobutyl, n-propyl and isopropyl, phenyl, tolyl and xylyl radicals, $R_1$ is selected from the group consisting of methyl and vinyl radicals, and Y represents a readily hydrolyzable radical such as ethoxy, methoxy, phenoxy, butoxy, bromine, chlorine, fluorine, and amine radicals with ($b$) two to ten mols of a silane having the formula

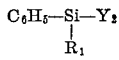

where $R_1$ and Y have the same meaning, hydrolyzing the mixture, equilibrating the hydrolyzate with a mineral acid, such as 10% to 90% sulfuric acid and hydrochloric acid, or an alkali such as sodium hydroxide, potassium hydroxide, quaternary ammonium bases such as trimethylbenzylammonium hydroxide. The hydrolysis and condensation may be carried out more or less simultaneously by introducing, for instance, 80% sulfuric acid into the mixture of silanes. If the silanes include a halogen, for instance chlorine, then simple addition of water or crushed ice to the mixture will evolve sufficient halogen acid to provide for rapid hydrolysis and equilibration of the hydrolyzate to a desired condensate. The resulting polysiloxane may be readily separated from the water and equilibrating medium. The use of an organic solvent facilitates the separation of the polysiloxane and the organic solvent may be readily removed subsequently by evaporation, leaving a polysiloxane which can be readily fractionally distilled to remove volatile disiloxanes, trisiloxanes and unreacted monomers. One mol of a disiloxane may be substituted for each two mols of the ($a$) end-blocking silane to furnish end-blocking groups by cleavage. In such disiloxanes there are six hydrocarbon radicals attached to the two silicon atoms, there being at least one methyl on each of the silicon atoms, and not exceeding one phenyl and one vinyl radical on each of the silicon atoms. Examples of such disiloxanes are hexamethyldisiloxane, 1-phenyl-1,1-dimethyl-3-phenyl - 3,3 - dimethyldisiloxane, and 1,3-dimethyl-1,3-diphenyl-1,3-divinyldisiloxane.

The following examples illustrate the preparation of the polysiloxane compounds of this invention.

*Example I*

(A) A solution comprising 0.9 mol of diethoxyphenylvinylsilane and 0.3 mol of hexamethyldisiloxane in 600 cc. of benzene in a flask immersed in an ice bath was treated by adding thereto with stirring 375 cc. of cold 80% sulfuric acid. The acid was added slowly over a period of ¼ hour. Stirring of the mixture was continued for one hour while the temperature of the mixture was maintained at from 0° C. to 5° C. The flask was removed from the bath and stirring was continued for another hour during which time the temperature rose practically to room temperature (25° C.). At the end of this period a liter measure (approximately 700 grams) of crushed ice with some ice water being present was added slowly to the flask. After stirring for a brief period of time the mixture was permitted to separate into two layers and the supernatant layer of benzene solution was decanted. The benzene solution was washed with water, dilute aqueous alkali and freed of acid. The benzene solution was then dried over anhydrous sodium sulfate. Thereafter the benzene was evaporated leaving 170 grams of a polysiloxane and having the following average composition:

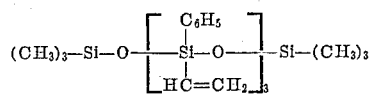

The polysiloxane had a viscosity of 12.3 centistokes at 25° C.

When subjected to fractional distillation, the mixture yielded a small quantity of the monovinyl compound ($n=1$ in Formulation 3), but the remaining higher polymers required extremely high vacua (0.1 mm. Hg and lower) and temperatures of over 100° C. to cause more to distill off. When the monovinyl trisiloxane fraction was admixed with either methyl methacrylate or triallyl cyanurate, the mixtures readily reacted upon heating to form solid copolymers. A portion of the polysiloxane mixture of this example was treated with 0.8% by weight of tertiary butyl perbenzoate and heated for one hour at 135° C. The polysiloxane thermoset into a voidless crack-free body which had a volume only 5% less than the volume of the liquid.

(B) The process of this Example I(A) is repeated substituting, however, 0.9 mol diethoxytolylvinylsilane for the diethoxyphenylvinylsilane. The resulting polysiloxane is a liquid of substantially the same viscosity as the product of portion (A) of this example.

*Example II*

(A) A solution of 6 mols of dichlorophenylvinylsilane, and 4 mols of chlorotrimethylsilane in 1 liter of benzene was added slowly with stirring to 2900 grams of crushed ice. Stirring was continued for 3½ hours and then the benzene solution was separated and washed free of acid following the procedure of Example I. Upon evaporation of the benzene there resulted 1048 grams of polysiloxane liquid having a viscosity of 44 centistokes at 25° C. While this polysiloxane mixture had the same average composition as the product of Example I, the polysiloxane of Example I had a larger proportion of molecules of 3 and 4 silicon atoms than did the product of this example. Almost the entire product of this Example II comprised compounds with 5 silicon atoms.

The liquid polysiloxane of this Example II was admixed with 1.5% of its weight of tertiary butyl perbenzoate and after being heated at 130° for one hour, it set up to a hard resin.

(B) The process of this Example II(A) is repeated substituting 4 mols of chloroethyldimethylsilane for the chlorotrimethylsilane. The resulting ethylmethylphenylvinyl polysiloxane is slightly more viscous than that of this Example II(A).

*Example III*

A solution of 0.1 mol of diethoxyphenylvinylsilane and 0.05 mol of 1,3-dimethyl-1,3-diphenyl-1,3-divinyldisiloxane in 100 cc. benzene was treated by slowly admixing therein, with vigorous stirring, 50 cc. of 80% sulfuric acid while being maintained at a temperature of substantially 0° C. in an ice bath. The mixture was stirred for an additional hour while maintained on the ice bath, and then the flask with the mixture was removed from the bath and stirred a further hour during which time the composition reaches a temperature close to room temperature. Thereafter, several hundred grams of ice and cold water were added slowly with stirring. The benzene layer was permitted to separate, was removed and washed free of acid in accordance with the procedure of Example I. After the benzene was evaporated there resulted 29 grams of a siloxane fluid having a viscosity of 15 centistokes at 25° C. This polysiloxane had the following average composition

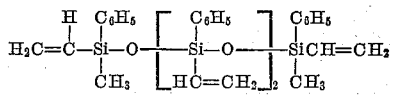

A sample of the composition of this Example III admixed with 0.8% by weight of tertiary butyl perbenzoate gelled in 40 minutes at 130° C. to a void-free, solid polymer.

The compound 1,3-dimethyl-1,3-diphenyl-1,3-divinyldisiloxane was prepared in the following manner. Methylbromide gas was passed into a flask containing 500 cc. dry ether, one gram atom of magnesium and one mol of diethoxyphenylvinylsilane. After all the magnesium had reacted, the mixture was refluxed for two hours during which time salts precipitated. The salts were filtered off and the filtrate was distilled giving 98.5 grams of ethoxymethylphenylvinylsilane; boiling point 59° C./2 mm.; $n_D^{25}$ 1.4909. The calculated silicon content is 14.57%; found 14.54%. This ethoxysilane was dissolved in benzene and hydrolyzed with 75% $H_2SO_4$ following the procedure of Example I, giving the disiloxane, 1,3-dimethyl-1,3-diphenyl-1,3-divinyldisiloxane: boiling point 85–86° C./0.07 mm. $n_D^{25}$ 1.5302.

*Example IV*

(A) A solution comprising 0.2 mol of diethoxyphenylvinylsilane and 0.1 mol of hexamethyldisiloxane in 150 cc. of benzene was placed in a flask on an ice bath. There was slowly added to the contents of the flask with stirring, 100 cc. of 80% sulfuric acid. The temperature of the mixture varied between 0° C. to 5° C. during the admixing. The mixture in the flask was stirred vigorously for one hour while on the ice bath and for an additional hour with the ice bath removed so that the contents of the flask approached a temperature of 20° C. Several hundred grams of crushed ice with some water present was then slowly added with vigorous agitation to the mixture in the flask. When the addition had been completed the contents of the flask were permitted to separate and thereafter the supernatant benzene layer was separated and washed free of acid in the manner indicated in Example I. Evaporation of the benzene left a fluid polysiloxane in an amount of 41 grams. The siloxane had a viscosity of 11.5 centistokes at 25° C. The polysiloxane had an average composition

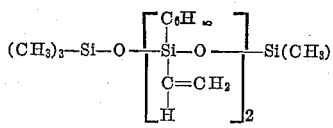

(B) The process of this Example IV(A) was repeated on a mixture comprising one mol of hexamethyldisiloxane and seven mols of diethoxyvinylphenylsilane. After evaporating benzene the fluid polysiloxane was fractionally distilled to remove disiloxanes and trisiloxanes. The resulting polysiloxane had an average value of $n=7$. Its viscosity was 70 centipoises at 25° C.

*Example V*

A flask containing a solution of 0.1 mol of diethoxymethylphenylsilane and 0.05 mol of 1,3-dimethyl-1,3-diphenyl-1,3-divinylsilane in 100 cc. of benzene was cooled on an ice bath to approximately 0° C., then 50 cc. of 80% sulfuric acid was slowly added, with stirring, over a period of time. After stirring the contents of the flask for an hour while on the ice bath, the ice bath was removed, and stirring continued for another hour while the flask warmed up to room temperature. Crushed ice was slowly added and stirring continued for half an hour. The mixture was permitted to stand, and the supernatant benzene layer was decanted. After washing, drying and evaporating the benzene as in Example I, there resulted 27 grams of a polysiloxane of a viscosity of 15 centistokes at 25° C. The average formulation was:

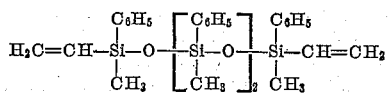

This polysiloxane with 2% of ditertiary butyl peroxide polymerized at 130° C. in several hours to a hard solid.

The polysiloxanes having the formula

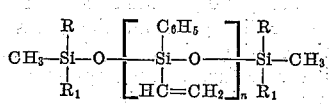

wherein the letters R, $R_1$ and $n$ have the meaning previously set forth, comprise low viscosity, reactive fluids that may be employed for many purposes. The liquid polysiloxanes may be readily polymerized to a solid upon heating by admixing therein a vinyl type polymerization catalyst, such, for example, as benzoyl peroxide, lauroyl peroxide, methyl ethyl ketone peroxide, t-butyl hydroperoxide, ascaridole, tertbutyl perbenzoate, di-t-butyl diperphthalate, ozonides, and the like. Such catalysts may be employed in an amount of from 0.1% to 2% by weight, although somewhat larger or smaller amounts may be employed, if desired. Furthermore, polymerization accelerators may be added to such catalysts in an amount of for example 0.01% by weight.

Furthermore, the polysiloxanes may be cured, without any added catalyst, by subjecting them to either ultraviolet light or radiation of higher frequency, including gamma rays or electron beam radiation which latter may be obtained from a Van de Graaff generator, or from a radioactive material such as radioactive cobalt which will apply thereto electrons, and gamma rays. The fluid polysiloxane may be subjected to electron beam radiation at least 0.05 m.e.v. to apply from 2 to 50 mega REP to produce solid polymers therefrom.

The shrinkage in volume in polymerizing the liquid polysiloxanes to solids is from about 4% to 5%. This is quite low. By adding fillers, such as finely divided silica, the shrinkage may be reduced even further. A composition comprising 50% of 200 mesh silica and 50% of the polysiloxane will have a volume shrinkage of about 2% in curing to a solid. These low shrinkage properties constitute highly desirable characteristics of these compositions.

Applications for the polysiloxane fluids comprise the potting of electrical members such as transformers, coils, resistors, and the like. In such potting applications, the electrical coil or transformer core with its windings is disposed within a casing, either metallic or of a plastic. The latter may be preformed or else produced by applying an encapsulating coating of a thick viscous resin to the outer surface portions of the apparatus and curing the coating, and the liquid polysiloxanes are poured into the casing through an opening in the top portions of the cured solid coatings to fill the interior of the casing fully therewith. For the most satisfactory impregnation the electrical members disposed in a casing may be subjected to evacuation, preferably with heating, and then the casings are filled by flooding or pouring through a nozzle the liquid siloxanes to fill the casings to the level desired, and the polysiloxane is then cured to a solid resin.

Electrical coils and windings may be dipped in the fluid polysiloxanes of the present invention whereby they may be coated and impregnated with the compositions. The electrical coil or winding may comprise an electrical conductor wrapped with a fibrous or other solid but porous insulating material, such as glass tape, mica tape, asbestos tape, or combinations thereof. The pores in the solid insulation as well as spaces and interstices between the conductors will be filled or impregnated with the fluid polysiloxane compounds and the applied compounds cured to a solid.

Inasmuch as the fluid polysiloxanes are of such low viscosity, the impregnation and potting of electrical members is readily effected. However, upon the withdrawal of some electrical members from the fluid polysiloxane composition in which they are only being dipped, considerable drainage may take place before the polysiloxanes can be cured, particularly if using lowest viscosity (0.1 to 0.4 poise) fluid polysiloxanes. Consequently, simple dipping of smooth electrical members in the low viscosity polysiloxane composition will not produce complete filling of all the pores and spaces, though a thin coating of the liquid siloxanes will be applied to all the surfaces. By employing a plurality of successive impregnations or dips in the polysiloxanes followed either by heating or by irradiation to cure each applied coating, eventually a suitably heavy total coating and impregnation with the cured solid polysiloxane compounds will be obtained.

For some applications, however, it is desirable to have a completely reactive polysiloxane composition which has a viscosity of more than 0.4 poise at 25° C. and preferably of the order of 1 to 5 poises, while for some uses the viscosity may be as much as 10 poises. Polysiloxane compositions within this last range of viscosity are more suitable for certain dipping and coating applications than the extremely fluid polysiloxane compounds of Example I, for instance. Further, inasmuch as the polysiloxanes of Formulation 1 of this invention cure to relatively hard solid resinous bodies, tougher and more flexible solid bodies can be prepared by admixing with them other siloxanes having olefinic groups, and copolymerizing the mixtures. I have produced compositions of such desirable intermediate viscosity and capable of producing tougher solids by admixing therewith much higher viscosity polysiloxane compounds having a reactive >C=C< group. Viscous siloxanes with such reactive ethylenic groups attached to at least one silicon atom may include vinyl, allyl or methallyl siloxanes. In order to attain compatibility of the polysiloxanes in such mixtures, at least about 50% of the radicals attached to silicon in such viscous polysiloxanes, other than oxygen and residual hydroxyl groups directly bonded to silicon, should comprise at least one radical selected from the group consisting of methyl and phenyl radicals. In preparing such siloxanes of intermediate viscosity there should be present at least 10% by weight of a polysiloxane having the formula (1) 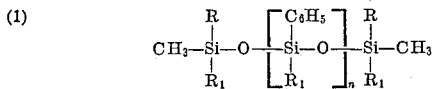

the viscosity not exceeding 1.0 poise, and the balance, comprising at least 10% by weight of the mixture, being at least one compatible siloxane having a viscosity of substantially more than 1 poise at 25° C., the latter siloxane having at least one ethylenic group per molecule and at least 50% of the remaining radicals directly attached to silicon, other than oxygen and residual hydroxyl groups, should comprise either phenyl or methyl radicals, or both. Particularly good results have been obtained from compositions with approximately 50% by weight comprising the low viscosity methylphenylvinyl polysiloxanes of Formulation 1 of this invention, and the remainder comprising one or more of the higher viscosity reactive siloxanes.

A suitable high viscosity olefinic polysiloxane for use in practicing the invention is that prepared by reacting a phenylvinyl silane monomer with a methylphenyl silane or a methylphenyl disiloxane.

*Example VI*

An example of a viscous polysiloxane for use in preparing the intermediate viscosity compositions is the product prepared by admixing 4 mols of dichloromethylvinylsilane and 6.0 mols of dichloromethylphenylsilane. The mixture dissolved in benzene, is hydrolyzed by adding ice water. The hydrolyzate is refluxed for several hours in the presence of KOH, neutralized with acid and heated at 150° C. Thereafter, the polysiloxane in benzene is separated out and, following evaporation of the benzene, there results a liquid polysiloxane having a viscosity of 13 poises at 25° C.

A mixture is prepared by combining 60 grams of the liquid polysiloxane of Example I(A) with 40 grams of the high viscosity siloxane of this Example VI. The mixture had a viscosity of 0.5 poises at 25° C. The polysiloxane composition was well suited for impregnating electrical members. The viscosity was sufficiently low that it would readily penetrate into fibrous materials such as glass fiber tapes and mica tapes applied to electrical conductors. The mixture was treated with 1% by weight of tertbutyl peroxide and a casting was made thereof. The composition gelled when heated to 105° C. for 30 minutes. The gelled body was then cured for two hours at 250° C. A test specimen cut from this casting had a tensile strength of 143 p.s.i. at 100 degrees C. The member elongated 8.8% before rupturing.

Solid resin castings were prepared from varying proportions of the polysiloxanes of this Example VI and the composition of Example I(A). For example, a mixture comprising 30 parts of the low viscosity polysiloxane of Example I was admixed with 70 parts of the high viscosity polysiloxane described in this Example VI and the resulting polysiloxane composition was polymerized with a peroxide catalyst and cured by heating to a solid as described herein. When tested at a temperature of 100° C. the tensile strength of the cured polysiloxane solid was 120 p.s.i., the modulus 960 p.s.i. and the elongation was 12%.

*Example VII*

One mol of diethoxyphenylvinylsilane was hydrolyzed with 10% sulfuric acid, the aqueous acid being insufficient to hydrolyze completely the ethoxy groups. Thereafter 3.5 grams of sodium dicarbonate was added to the mixture and followed with an addition of 300 cc. of a mixture of cracked ice and water. After thorough stirring there was added a quantity of ethyl ether to extract the reaction product from the aqueous medium. The ether solution was removed, washed with water and dried with anhydrous sodium sulfate. After evaporating the ether there was obtained a siloxane mixture which was fractionally distilled, giving as the main product a fraction boiling at 125° C. at a pressure of 0.05 mm. This fraction had a refractive index $n_D{}^{25}$ 1.5109. Elemental analysis showed it to be the dimer having the structural formula:

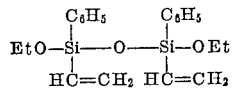

One part of this dimer was mixed with one part by weight of the liquid polysiloxane of Example I(A). When catalyzed with 1% of tertiary butyl perbenzoate catalyst, the mixture polymerized into a solid at 150° C. in several hours.

The low viscosity polysiloxanes of the present invention may be admixed with allyl and methallyl siloxanes disclosed in Patents 2,595,727–28–29 and 30. The low viscosity siloxanes disclosed herein function as a reactive solvent for the high viscosity allyl and methallyl siloxanes. The resulting joint compositions constitute improved completely reactive impregnating and potting compositions.

It will be appreciated that the polysiloxane compounds and compositions prepared therewith may be admixed with non-olefinic siloxane fluids, which latter are compatible therewith, to function as plasticizers therefor. Furthermore, hydrogenated terphenyl as described in Patent 2,590,493 may be added in amounts of up to 20% by weight to function as a plasticizer in the event that more flexible cured solids are desired. Thus 5% of hydrogenated terphenyl (known as HB40) and 95% by weight of the polysiloxane of Example II(A) when cured is more flexible than the solid of Example II(A) alone.

The thermosettable fluid polysiloxanes of this invention are suitable for impregnating porous metal castings wherein they are cured and thereby produce usable cast members.

It will be understood that the above description is illustrative and not limiting.

I claim as my invention:

1. A low viscosity, reactive fluid polysiloxane having the formula

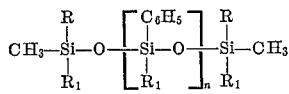

wherein R represents at least one monovalent radical selected from the group consisting of alkyl radicals having not more than 4 carbon atoms and aryl radicals comprising a benzene ring with not more than two methyl groups substituted for hydrogen, $R_1$ represents at least one monovalent radical selected from the group consisting of methyl and vinyl groups per molecule, there being an average of at least two vinyl groups per molecule, and $n$ is at least two, and has an average value of at least 2.0 and not exceeding 10.

2. A low viscosity fluid polysiloxane having the formula

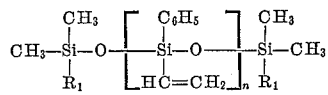

where $R_1$ represents a monovalent radical selected from the group consisting of methyl and vinyl radicals, there being an average of at least two vinyl groups per molecule, and $n$ is at least two and has an average value of at least 2.0 and not exceeding 10.

3. A siloxane having the formula

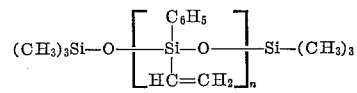

where $n$ is at least one and has average value of from 2 to 10.

4. The siloxane of claim 3, wherein $n$ has an average value of from 2.25 to 3.5.

5. A siloxane composition comprising a mixture of (a) at least 10% by weight of a low viscosity fluid polysiloxane having the formula

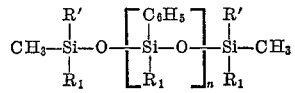

where R' represents a monovalent radical selected from the group consisting of methyl and phenyl radicals and $R_1$ represents a monovalent radical selected from the group consisting of methyl and vinyl radicals, there being an average of at least two vinyl groups per molecule, and $n$ is at least two and has an average value of from 2 to 10, said (a) siloxane having a viscosity of less than one poise, and the balance, comprising at least 10% of the weight of the mixture, being (b) at least one compatible hydrocarbon substituted siloxane wherein said siloxane has about 2 hydrocarbon groups per silicon atom attached to silicon by C to Si bonds having a viscosity of substantially more than one poise, the said (b) siloxane having at least one ethylenic group per molecule directly attached to silicon by a C to Si bond, said ethylenic group being selected from the group consisting of vinyl, allyl and methallyl radicals and at least 50 percent of the radicals directly attached to silicon, other than oxygen and residual hydroxyl groups directly attached to silicon, consisting of at least one radical selected from the group consisting of methyl and phenyl radicals, the mixture having a viscosity of the order of from 40 centipoises to 10 poises.

6. The siloxane composition of claim 5, wherein the mixture comprises approximately 30% to 50% by weight of the (a) siloxane wherein R' and $R_1$ are methyl groups and $n$ has an average value of from 2 to 3.5, and the viscosity thereof is between 10 and 40 centipoises, and the balance comprises another linear liquid siloxane (b) wherein the hydrocarbon groups are substantially only methyl, phenyl and vinyl groups attached to silicon, other than oxygen and residual hydroxyl groups attached to silicon, and the siloxane comprises at least one vinyl group per molecule, the viscosity of the said siloxane (b) being at least 5 poises, the mixture having a viscosity of between 0.4 and 5 poises.

References Cited in the file of this patent
UNITED STATES PATENTS

| 2,386,441 | Daudt | Oct. 9, 1945 |
| 2,480,822 | Hyde | Sept. 6, 1949 |
| 2,604,487 | Burkhard | July 22, 1952 |
| 2,714,099 | Weyenberg | July 6, 1955 |

OTHER REFERENCES

Scott et al.: "Jour. Am. Chem. Soc.," vol. 73 (1951), pp. 2599, 2600. (Copy in Scientific Library.)

Rochow: An Introduction to the Chemistry of the Silicones, 2nd ed., 1951, pages 82–87, publ. by John Wiley and Sons, N.Y. (Copy in Scientific Library.)